United States Patent [19]

Carson et al.

[11] Patent Number: 4,629,149
[45] Date of Patent: Dec. 16, 1986

[54] METHOD OF AND APPARATUS FOR DE-ICING AN ELASTICALLY DEFORMABLE SHEET MEMBER

[75] Inventors: Oliver S. Carson, Belfast; George McMurtry, Bangor; James E. Carrington, Lisburn, all of Northern Ireland

[73] Assignee: Short Brothers Limited, United Kingdom

[21] Appl. No.: 708,930

[22] PCT Filed: Aug. 21, 1984

[86] PCT No.: PCT/GB84/00292
§ 371 Date: Feb. 21, 1985
§ 102(e) Date: Apr. 8, 1985

[87] PCT Pub. No.: WO85/01028
PCT Pub. Date: Mar. 14, 1985

[30] Foreign Application Priority Data

Aug. 24, 1983 [GB] United Kingdom ............... 8322738

[51] Int. Cl.⁴ ..................... B64D 15/16; B64D 15/00
[52] U.S. Cl. ............................................. 244/134 R

[58] Field of Search .......... 244/134 R, 134 A, 134 D, 244/134 F, 134 C, 134 E; 310/15, 27, 30; 318/128

[56] References Cited

U.S. PATENT DOCUMENTS 2,297,951 10/1942 Frank ............................. 244/134 A
2,675,456 4/1954 Cleminson et al. ............. 244/134 A
4,399,967 8/1983 Sandorff ......................... 244/134 R

FOREIGN PATENT DOCUMENTS 505433 12/1938 United Kingdom ........... 244/134 A

Primary Examiner—Galen Barefoot
Assistant Examiner—Lynn M. Fiorito
Attorney, Agent, or Firm—Kenyon & Kenyon

[57] ABSTRACT

An economical method of, and apparatus for, de-icing the skin panels (25) of aircraft employs electromagnetic solenoid actuators (1) which use normal supply voltages (43) available on aircraft to flex the skin panels slowly and rely upon abrupt termination (S) of the flexing pressure and the consequent fast natural elastic relaxation of the panels to break the bond between the panels and the ice accreted thereon, to shrug off the ice from the panels.

13 Claims, 4 Drawing Figures

METHOD OF AND APPARATUS FOR DE-ICING AN ELASTICALLY DEFORMABLE SHEET MEMBER

TECHNICAL FIELD

This invention relates to de-icing and more particularly, but not exclusively, concerns de-icing of surface components of aircraft.

As used herein, the term "ice" and cognate expressions should be taken to refer primarily, but not exclusively, to water in its solid state. The present invention may have application to, for example, certain industrial processes, the operation of which is hindered by build-up of a layer of a crystalline substance on a wall surface of process plant, such build-up being analogous to the build-up of ice on the surface components of aircraft.

BACKGROUND ART

British Patent Application No. 2105520A discloses an electro-mechanical aircraft de-icer in which an electrical coil induces electro-magnetic impulses within a metal plate secured through a compliant spacing layer to the surface to be de-iced. The de-icer requires the use of high voltages and high energy special purpose capacitors and components such as thyristors and diodes which operate at the necessary high voltage and handle large currents for short periods. The high voltage brings difficulties with electrical insulation, weight and space requirements. None of this is desirable in aircraft, and one object of the present invention is to employ, for de-icing, voltages which are lower than those previously proposed.

British Patent Specifications Nos. 1222151 and 1369350 are earlier publications which, in common with 2105520A, proposed to induce electro-magnetic impulses within the sheath or skin of an aircraft. They therefore suffer from the same disadvantages.

DISCLOSURE OF INVENTION

According to a first aspect of the present invention there is provided a method of de-icing an exposed surface of a resilient sheet member, which method comprises the steps of:

i. applying a force to the sheet member to displace it relatively slowly from a relaxed disposition to an elastically loaded disposition;

ii. abruptly removing the said force to allow the sheet member to return to the relaxed disposition at a relatively fast rate of displacement for de-icing the sheet member; and iii. repeating steps (i) and (ii) for as long as de-icing is required.

According to a second aspect of the present invention there is provided apparatus for de-icing an exposed surface of a resilient sheet member comprising means for applying a force to the sheet member to displace it relatively slowly from a relaxed disposition to an elastically loaded disposition, means to remove abruptly the said force to allow the sheet member to return to the relaxed disposition at a relatively fast rate of displacement for de-icing the sheet member; and means for effecting the said force application and removal repeatedly for as long as de-icing is required.

The actuator is conveniently an iron-cored solenoid. The sophistication of control of the movement of the core will vary with embodiments of the invention, as is illustrated hereinbelow.

It will be appreciated that ice is dislodged from the exposed surface of the sheet member more by the sudden relaxing movement of the sheet which follows removal of the force than by the flexing of the sheet, away from its relaxed disposition, under the action of the applied mechanical force. It will also be appreciated that it is the application of the flexing force in a gradual manner and over a relatively lengthy period of time which allows low voltages to be used instead of the high voltages needed to generate a sudden, impulsive flexing of the sheet member.

Normally, in use of the invention, an aircraft will be fitted with a plurality of the actuators. When more than one actuator operates on a single sheet member, means would be provided to cause the operation of the actuators to complement, rather than conflict with, one another.

Feedback elements can be provided, as thought desirable, to monitor and complement de-icing performance and to detect faults. Useful as feedback elements are pressure sensors on the actuator, sensors of electrical current in the actuator and strain sensors to measure sheet displacement.

Duplication of components of the apparatus is proposed whenever the need for reliability is high enough to justify such provision.

The apparatus of the invention is driven by a voltage which is in a range which includes that normally provided on aircraft. It uses comparatively little energy and, because the actuator consumes current for only short periods of time, has a negligible tendency to warm up in use. It requires many fewer components than the previous proposals, suggesting greater reliability and lower weight and cost. These are indications that it is much more amenable to use in aircraft than the previous proposals mentioned above.

BRIEF DESCRIPTION OF DRAWINGS

Embodiments of the invention will now be described, by way of example, with reference to the accompanying drawings, in which.

MODES FOR CARRYING OUT THE INVENTION

Figure 1:
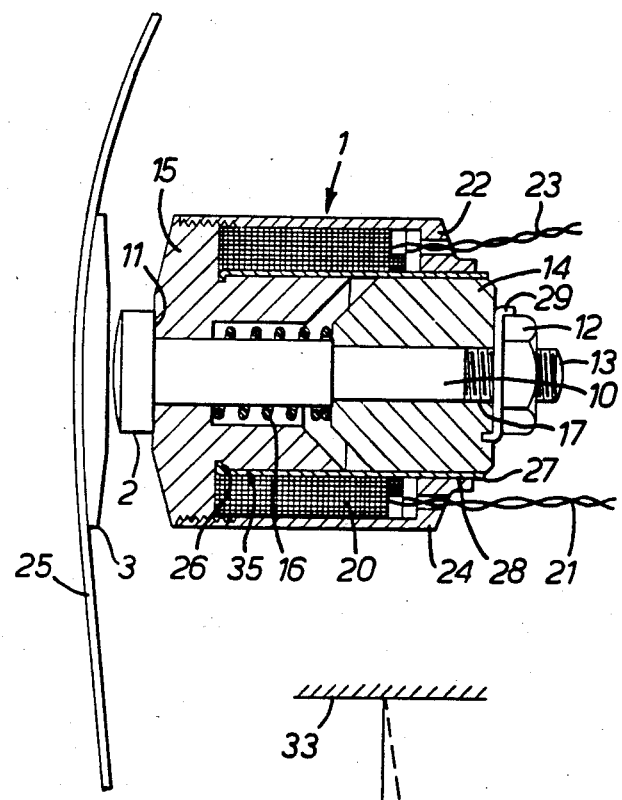
FIG. 1 is a section through the longitudinal axis of the iron core of a solenoid actuator.

Referring to FIG. 1, the solenoid actuator is identified generally by reference 1. It has a protruding, stainless steel push head 2 which constitutes the head of a corrosion-resistant, non-magnetic pin 10 locating axially within the actuator. Between a shoulder 11 and a retaining nut 12 on a threaded end portion 13 of the pin 10, there is carried a soft iron core of the solenoid which comprises a mobile portion 14, a static portion 15 and a compression spring 16 which urges the two said portions apart from one another. The mobile portion is threaded at 17 to engage with the threaded portion 13 of the pin 10. Conversely, the pin 10 is free to slide on the static portion 15 within the constraints offered by the shoulder 11 and the operation of the compression spring 16.

Surrounding the soft iron core is an actuator coil 20 to which current is fed by leads 21 and, at one end of the coil 20, a small fault detector search coil 22 to which connections are made by leads 23.

The coils 20 and 22 are situated immediately within a generally cylindrical housing 24 of the actuator, to which the static portion 15 of the core is threadably engaged. Just within the coils 20 and 22 is a thin tube 35 of non-metallic material, in this embodiment brass, secured at one end to the static portion 15. On the other end 27 of the brass tube 35 slides the mobile portion 14. The tube 35 fits within a cylindrical surface 28 of the housing 24.

The actuator housing 24 is mounted to an aircraft structure, with a degree of rigidity appropriate to its function, adjacent a resilient sheet member 25 which is part of the thin skin of the aircraft.

In the area of the skin 25 where the push head 2 is located, there is bonded to the skin 25 which faces the push head 2 a stainless steel protective plate 3.

The actuator is mounted such that the push head 2 is spaced from the plate 3 by an amount sufficient to allow for free oscillation of the deflected member 25 when the solenoid is de-energised. This amount is dependent upon the characteristics of the resilient sheet member 25 but is typically 2 millimeters. The purpose of the protective plate 3 is to prevent any high local stresses in the thin skin 25 which might otherwise occur in use of the actuator by direct contact of the push head 2 with the skin 25.

The performance characteristics of the solenoid are selected to suit the circumstances of any particular application of the invention, but the ideal requirements are that the inertia of the moving parts, that is to say, the push head 2 and pin 10, and the mobile portion 14 of the core, the locking nut 12 and any locking washer 29, and the velocity when the push head 2 contacts the plate 3 shall each be such as to minimise impact stresses. Typically, the weight of the entire actuator is around 1 Kg, and of the moving parts about 300 gm. Peak armature velocity is typically around 1 millimeter per second.

Control of the solenoid is arranged to be such that, after contact, the solenoid develops the required force thereby to achieve the required deflection of the thin skin 25. The solenoid controller then switches off the solenoid, allowing the spring 16 to move the push head 2 clear of the plate 3. The skin 25 as a consequence undergoes a damped oscillation in returning to its relaxed position, the form of which oscillation is dependent on the inherent natural frequency and damping characteristics of the skin and any adherent ice.

Those skilled in the art will be familiar with the technical procedures by which construction and operation of the solenoid is optimised in any particular temperature and vibrational environment.

To effect complete de-icing of the area of a skin panel a plurality of solenoids may be provided, each being selected for energising in accordance with a sequence, such sequence being controlled as appropriate, for example, in a sequence used in the previously proposed electro-mechanical de-icing procedures.

Figure 2:
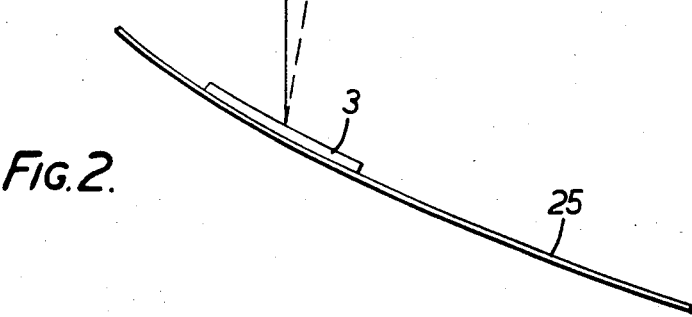
FIG. 2 is a transverse view of a similar actuator showing schematically one way of transmitting its movements to the member to be de-iced.

The arrangement shown in FIG. 2 can be useful in applications wherein the skin panel 25 lies parallel to or at an angle to another member, which could be structural as shown, or another thin skin panel. Tie rods 30, 31 and 32 are secured to the protective plate 3, the other member 33 and the push head 2, respectively, and to each other at a pin joint 34. The tensile stress in the tie rod 30 which results from operation of the actuator 1 is greater than the tensile stress in the push head 2, and the illustrated arrangement is amenable to the use of a solenoid with a long stroke/low force characteristic so that the design and installation criteria are thus less critical in the area of manufacturing variations in the solenoid and associated structure.

In a variant, not illustrated, the solenoid actuator can be arranged to push rather than pull the pin joint, although this will again result in a tensile stress in the link 30.

It will be appreciated that any links or tie rods connecting the actuator to the skin 25 may take a variety of forms, such as, a flexible wire cable to which the push head of the solenoid actuator is connected by a pulley over which the cable runs.

Figure 3:
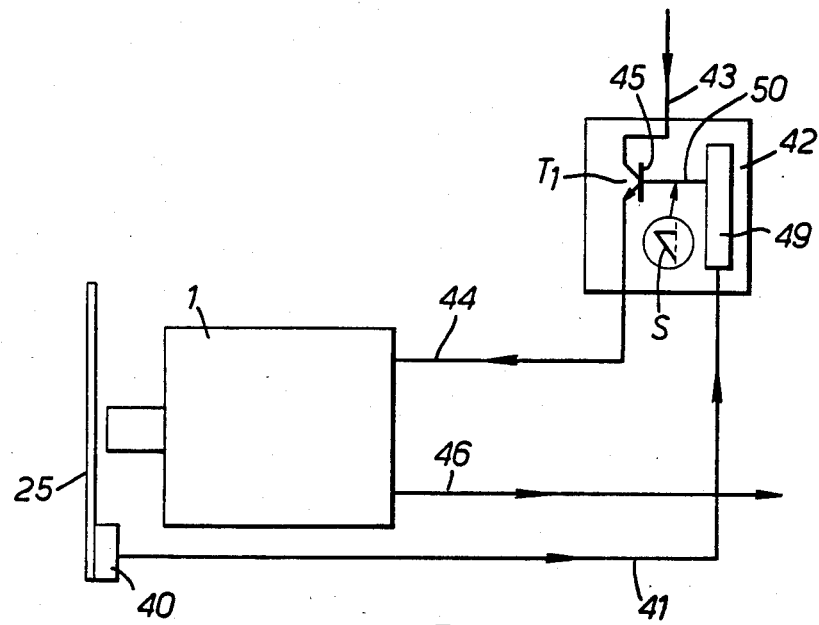
FIG. 3 is a schematic diagram of means for controlling operation of the actuator.

FIG. 3 shows a closed loop control system, the principles of construction and operation of which, per se, will be familiar to those skilled in the art. In the illustrated example, a displacement transducer 40 mounted on the skin 25 to be de-iced transmits a signal along line 41 to an actuation control unit 42 which is responsible for feeding power from an input 43 along a line 44 to the actuator 1. The control unit 42 ensures that the push rod 2 develops only that force which secures a required displacement of the skin 25, unaffected by any variations in the structural configuration, environmental conditions and power supply. In addition, the closed loop control system may process feedback signal data by mathematical differentiation or integration in order to improve stability, accuracy, or rate of response, or to achieve an optimised combination of these features.

FIG. 3 shows a first embodiment of actuation control unit 42 for obtaining the required variation of electrical current in the main winding of the solenoid, such as to provide an initial current, and hence mechanical force, which increases linearly from zero with time until the desired deflection of the skin 25 is obtained. Thus, when the solenoid 1 is required to operate, transistor $T_1$ is made steplessly more conductive by the application of a linearly increasing signal voltage S to its base connector 45 along a line 50 from logic circuitry 49. An increasing current flows from the supply 43 through transistor $T_1$ to the solenoid winding 20. When the desired deflection is sensed by the feedback device 40 the logic circuit 49 reduces the current to zero by bringing the signal voltage in the line 50 rapidly to zero, causing the transistor $T_1$ to become non-conductive. In one typical application of the apparatus, the current increases linearly over a period of two seconds, and falls to zero thereafter substantially instantaneously.

FIG. 3 also illustrates the use of feedback signals for fault detection purposes. Specifically, a pressure feedback signal is tapped from the actuator 1 along a line 46, and supplied to fault detection equipment (not shown).

Figure 4:
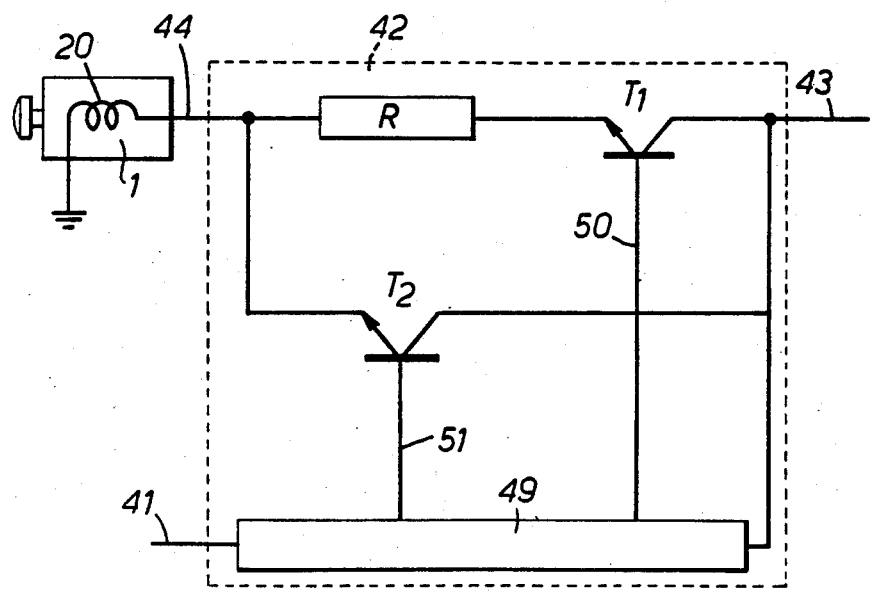
FIG. 4 is a diagram of an alternative circuit for varying the current to the actuator.

FIG. 4 shows a second embodiment of actuation control unit 42 for obtaining the required variation of electrical current in the main winding 20 of the solenoid, such as to provide an initial current value which is small, and subsequently, after a time delay, a stepped increase to a higher value of electrical current, for a required period of time, to obtain the desired deflection of the skin 25. Thus, when the solenoid 1 is required to operate, transistor $T_1$ is switched on by application of a signal voltage to its base connector along a line 50 from actuation control logic 49. Current flows from the supply 43 through transistor $T_1$ and resistor R to the solenoid winding 20. After a delay determined by the program of the actuation control logic 49, transistor $T_2$ is switched on by a signal voltage on its base supplied along line 51 from the logic 49. Current then flows from the supply 43 through transistor $T_2$ directly to the solenoid winding 20. The effect is a step-wise application of force to the skin 25. After a further delay, again determined by the actuation control logic 49, the voltage signals in lines 50 and 51 are both reduced to zero, so that both transistors $T_1$ and $T_2$ become non-conducting, thereby reducing instantly to zero the current previously supplied to the solenoid winding 20. As in FIG. 3, the logic 49 receives as a control input along the line 41 the output from the transducer 40.

INDUSTRIAL APPLICABILITY

The proposals herein described are applicable primarily to the field of de-icing of the surfaces, otherwise called lipskin, of aircraft, but also to any other field where accretion of crystalline matter on an elastically deformable substrate is considered undesirable and a method of preventing it is required.

We claim:

1. A method of de-icing an exposed surface of a resilient sheet member, which method comprises the steps of:
   i. applying a force that increases with time to the sheet member to deform the sheet member relatively slowly from a relaxed disposition to an elastically loaded maximum deflection disposition;
   ii. abruptly removing said force to allow the sheet member to oscillate freely at its natural frequency at a relatively fast rate of displacement and with decaying amplitude as the sheet member returns to the relaxed disposition for de-icing the sheet member; and
   iii. repeating steps (i) and (ii) for as long as de-icing is required.

2. A method according to claim 1 characterized in that the force which is provided for displacing the sheet member to the elastically loaded maximum deflection disposition increases continuously during each application thereof.

3. A method according to claim 1 characterized in that the force which is provided for displacing the sheet member to the elastically loaded maximum deflection disposition increases in a plurality of steps during each application thereof.

4. A method according to any one of the preceding claims characterized by the steps of:
   i. monitoring a condition of the sheet member at a time when it is subject to said force; and
   ii. controlling the force in dependence upon a monitored value of the condition.

5. A method according to claim 4 wherein said condition is strain within the sheet member.

6. A method according to claim 4 wherein said condition is the magnitude of the force acting on the sheet member.

7. A method according to claim 6 wherein the magnitude of the force is measured as a magnitude of electrical current flowing through an electromechanical actuator which generates the force.

8. Apparatus for de-icing an exposed surface of a resilient sheet member that is attached to a support structure, the apparatus comprising
   means connected to the support structure for applying a force transversely to an unsupported region of the sheet member;
   means for controlling said force applying means to deliver a force that increases with time to deform the sheet member relatively slowly from a relaxed disposition to an elastically loaded maximum deflection disposition;
   means to remove abruptly said force to allow the sheet member to oscillate freely at its natural frequency at a relatively fast rate of displacement and with decaying amplitude as the sheet member returns to the relaxed disposition for de-icing the sheet member; and
   means for effecting said increasing force application and abrupt removal repeatedly for as long as de-icing is required.

9. Apparatus as claimed in claim 8 wherein the means for applying force to the sheet member comprises an electromagnetic actuator, and means for controlling the flow of electrical current to the actuator.

10. Apparatus as claimed in claim 9 wherein the control means includes a variable resistance controlled by a logic circuit.

11. Apparatus as claimed in claim 10 wherein the variable resistance is a transistor or transistor-based device.

12. Appratus as claimed in claim 11 wherein the variable resistance is a transistor having a base, and the logic circuit continuously varies a bias on the base of the transistor variable resistance.

13. Apparatus as claimed in claim 11 wherein the variable resistance is a device comprising first and second transistors in parallel with each other, the first transistor having a resistance in series with it, and the logic circuit is such as to switch the first and second transistors in sequence, so that the first transistor is rendered conductive before the second transistor and the force generated by the actuator is thereby made to increase step-wise, upon the onset of conductivity of the second transistor.

* * * * *